United States Patent
Haub et al.

(10) Patent No.: US 10,476,612 B2
(45) Date of Patent: *Nov. 12, 2019

(54) TRANSCEIVER SYSTEM SUPPORTING RECEIVER SELF CALIBRATION AND METHODS OF PERFORMING THE SAME

(71) Applicant: SPREADTRUM COMMUNICATIONS USA INC., San Diego, CA (US)

(72) Inventors: David Haub, San Diego, CA (US); Lon Christensen, San Diego, CA (US); Zebin Wang, San Diego, CA (US)

(73) Assignee: SPREADTRUM COMMUNICATIONS USA INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,474

(22) Filed: Sep. 12, 2018

(65) Prior Publication Data

US 2019/0052373 A1 Feb. 14, 2019

Related U.S. Application Data

(63) Continuation of application No. 15/087,259, filed on Mar. 31, 2016, now Pat. No. 10,103,825.

(51) Int. Cl.
*H04B 17/14* (2015.01)
*H04B 17/21* (2015.01)
(Continued)

(52) U.S. Cl.
CPC ........... *H04B 17/14* (2015.01); *H04B 1/38* (2013.01); *H04B 17/21* (2015.01); *H04B 17/318* (2015.01)

(58) Field of Classification Search
CPC ...... H04B 17/14; H04B 17/21; H04B 17/318; H04B 1/38
See application file for complete search history.

(56) References Cited

U.S. PATENT DOCUMENTS

| 6,018,650 A * | 1/2000 | Petsko ............... H04W 52/10 455/232.1 |
| 2005/0157819 A1* | 7/2005 | Wang .................. H04L 27/364 375/322 |

(Continued)

*Primary Examiner* — Freshteh N Aghdam
(74) *Attorney, Agent, or Firm* — Kilpatrick Townsend & Stockton LLP

(57) ABSTRACT

A self-calibrating transceiver includes a baseband processor, a receiver chain comprising an amplifier and a digital front end (DFE), and a transmitter chain, and a calibration control state machine. The state machine stores amplifier gain steps and is in communication with the transmitter chain, the receiver chain, and the baseband processor. The state machine can set a receiver chain frequency at a predefined frequency and set a transmitter chain frequency to be offset relative to the receiver chain frequency. For each of the amplifier gain steps, the state machine can set a gain of the receiver chain and set a power of the transmitter chain. The baseband processor can measure an RSSI and transmit the measured RSSI to the state machine. The state machine can determine a digital gain compensation value based on the one or more measured RSSIs and apply the determined digital gain compensation value.

20 Claims, 7 Drawing Sheets

(51) Int. Cl.
*H04B 1/38* (2015.01)
*H04B 17/318* (2015.01)

(56) References Cited

U.S. PATENT DOCUMENTS

| | | | | |
|---|---|---|---|---|
| 2006/0223558 A1* | 10/2006 | Behzad | ................ | H04B 1/0082 |
| | | | | 455/502 |
| 2009/0034651 A1* | 2/2009 | Lan | ....................... | H04L 25/061 |
| | | | | 375/296 |
| 2011/0207418 A1* | 8/2011 | Laroia | ..................... | H03D 3/008 |
| | | | | 455/75 |
| 2017/0093458 A1* | 3/2017 | Rafique | .................. | H04B 17/21 |

* cited by examiner

TRANSCEIVER SYSTEM SUPPORTING RECEIVER SELF CALIBRATION AND METHODS OF PERFORMING THE SAME

BACKGROUND

Transmitters, receivers, and transceivers for broadcast devices, such as cellular phones, are designed using radio frequency (RF) and analog blocks that have several imperfections. Various functional design restrictions, as well as broadcasting requirements and best practices, require that the various components of the cellular transmitter, receiver, and/or transceiver meet difficult design specifications.

The issue of meeting these design specifications can be addressed through analog design methods. That is, either extra circuitry and/or extra design time are used in order to achieve the required performance. The extra circuitry and/or circuit methods used to address these issues can often lead to more power consumption in the final design. Additionally, the added circuitry and/or circuit design involves the designer spending extra design time applying complicated design techniques in order to reduce the variation in output. Often, this might involve temperature and frequency compensating circuits that add to the complexity and die area of the design.

The issues can also be addressed using factory calibration. Using this method, less time is spent on additional analog design and/or design time in exchange for doing compensation for the imperfections in mass production. In order to support this, digital compensation circuits are added that can compensate for the various analog imperfections. For example, simple digital circuits can be added to offset imperfect analog signals. The compensation circuits can be small and easy to design, thus representing an improvement over using more complicated analog-only circuit design. However, in order to support the various compensations, this method requires factory calibration, meaning that various test signals must be injected and measured during mass production of the circuitry in the factory to determine the offsets to be used in the compensation circuits. Therefore, the negative aspect of this method is increased factory calibration time, which increases the cost of the end product.

These and other shortcomings are addressed in the description below.

SUMMARY

It is to be understood that both the following general description and the following detailed description are exemplary and explanatory only and are not restrictive. Provided are methods and systems for self calibration of at least a receiver chain in a transceiver.

In a first aspect, a self-calibrating transceiver includes a baseband processor, a receiver chain comprising an amplifier and a digital front end (DFE), and a transmitter chain, and a calibration control state machine. The state machine stores amplifier gain steps and is in communication with the transmitter chain, the receiver chain, and the baseband processor. The state machine can set a receiver chain frequency at a predefined frequency and set a transmitter chain frequency to be offset relative to the receiver chain frequency. For each of the amplifier gain steps, the state machine can set a gain of the receiver chain and set a power of the transmitter chain. The baseband processor can measure an RSSI and transmit the measured RSSI to the state machine. The state machine can determine a digital gain compensation value based on the one or more measured RSSIs and apply the determined digital gain compensation value.

In a second aspect, a self-calibrating transceiver includes a baseband processor, a receiver chain comprising a digital front end (DFE), and a transmitter chain. The transceiver can further include a calibration control state machine that stores one or more predefined offset values and is in electrical communication with the transmitter chain, the receiver chain, and the baseband processor. The calibration control state machine can set a receiver chain frequency at a predefined frequency and can set a transmitter chain frequency to be offset relative to the receiver chain frequency. The calibration control state machine can store one or more predefined offset values. For each of the one or more predefined offset values, the calibration control state machine can set a frequency of the local oscillator to generate a test signal, the receiver chain can receive digital samples of the test signal, and the baseband processor can measure amplitude and phase information regarding the received signal samples and determine a phase and gain imbalance value corresponding to the test signal. The baseband processor can transmit the phase and gain imbalance value to the calibration control state machine. The calibration control state machine can determine a compensation value based on the phase and gain imbalance value and apply the compensation value.

In a third aspect, a self-calibrating transceiver can include a baseband processor, a receiver chain comprising a digital front end (DFE), and a transmitter chain. The transceiver can further include a calibration control state machine storing one or more predefined offset values. The calibration control state machine is in electrical communication with the transmitter chain, the receiver chain, and the baseband processor, and can set a receiver chain frequency at a predefined frequency, can set a transmitter chain frequency to be offset relative to the receiver chain frequency, and can set a receiver chain gain to a predetermined value. The receiver chain can receive one or more digital sample signals. The DFE can measure, for each of the received one or more digital sample signals, a DC in-phase offset value and a DC quadrature offset value, and can transmit the DC in-phase offset value and the DC quadrature offset value to the calibration control state machine. The calibration control state machine can determining an average DC in-phase offset value and an average DC quadrature offset value based on the one or more DC in-phase offset values and the one or more DC quadrature offset values, and can apply the average DC in-phase offset value to an in-phase channel of the receiver chain and applying the average DC quadrature offset value to a quadrature channel of the receiver chain.

Additional advantages will be set forth in part in the description which follows or may be learned by practice. The advantages will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
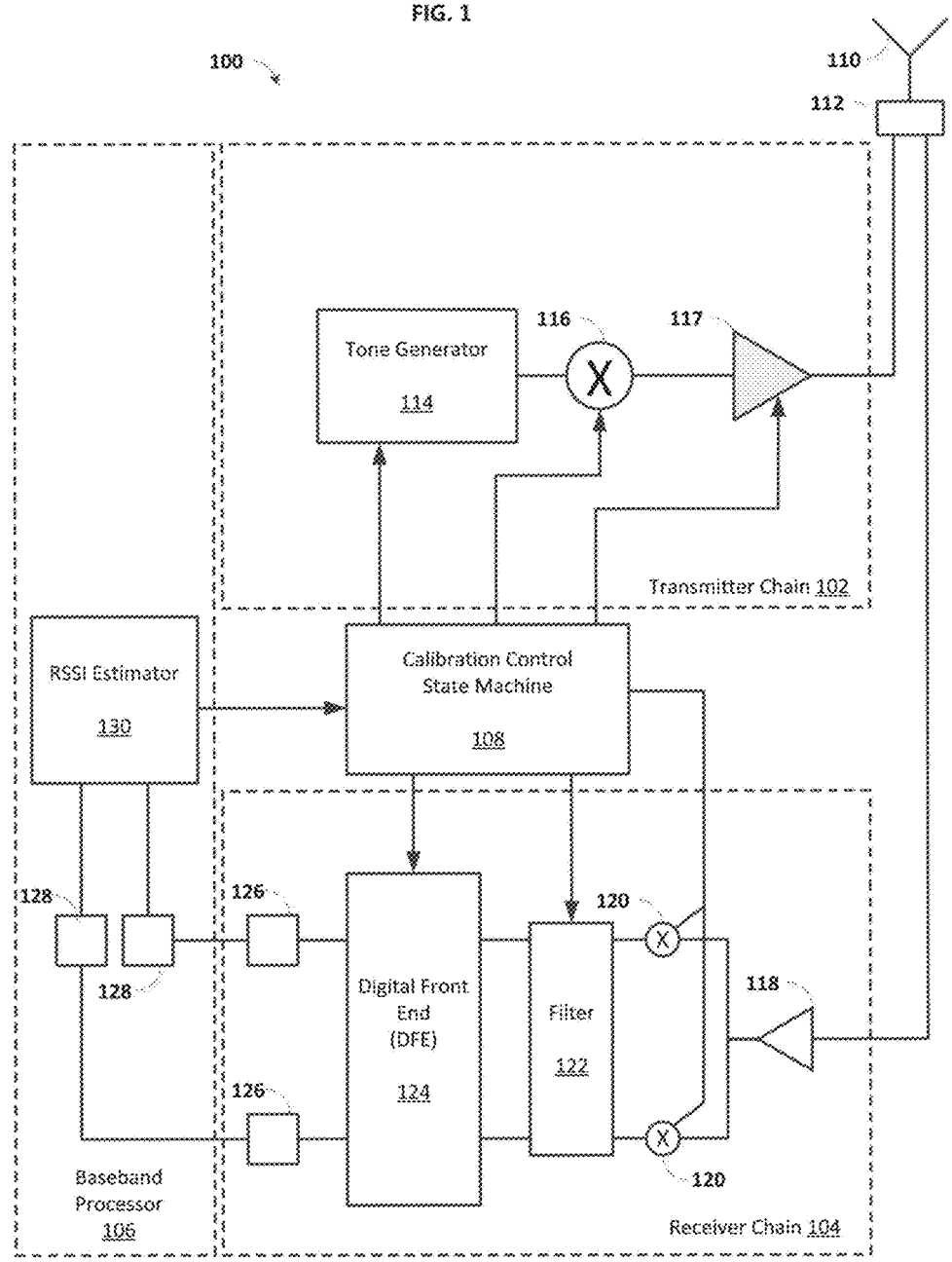
FIG. 1 is a schematic diagram of a self calibrating transceiver.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The terms "optional" or "optionally" is used when the subsequently described event or circumstance may or may not occur, and that the description includes instances where said event or circumstance occurs and instances where it does not.

Throughout the description and claims of this specification, the word "comprise" and variations of the word, such as "comprising" and "comprises." is defined as "including but not limited to," and is not intended to exclude, for example, other components, integers or sub-processes. "Exemplary" is defined as "an example of" and is not intended to convey an indication of an ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, sub-processes in disclosed methods. Thus, if there are a variety of additional sub-processes that can be performed it is understood that each of these additional sub-processes can be performed with any specific embodiment or combination of embodiments of the disclosed methods.

The present methods and systems may be understood more readily by reference to the following detailed description of embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block representing a digital component of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a method of implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational sub-processes to be performed on the computer or other programmable apparatus to produce a computer-implemented process such that the instructions that execute on the computer or other programmable apparatus provide sub-processes for implementing the functions specified in the flowchart block or blocks.

Accordingly, blocks of the block diagrams and flowchart illustrations support combinations of methods of performing the specified functions, combinations for performing the specified functions and program instruction methods of performing the specified functions. It will also be understood that each block of the block diagrams and flowchart illustrations, and combinations of blocks in the block diagrams and flowchart illustrations, can be implemented by special purpose hardware-based computer systems that perform the specified functions or sub-processes, or combinations of special purpose hardware and computer instructions.

The present disclosure relates to transceivers that provide an environment in which a receiver chain can be self-calibrated. For example, the receiver chain can be calibrated without the need for expensive time in factory calibration, and without the added expense of analog circuit design, or the added die area that such circuitry would consume. Cellular receivers are designed using RF analog blocks that have several imperfections. As examples, receiver imperfections that can adversely affect the cellular system include gain setting, filter corner, quadrature imbalance, direct current (DC) offset, and second order intermodulation.

Gain setting can affect a transceiver system because the transceiver requires an accurate estimate of received signal strength at the antenna. Estimation of the signal strength is performed in the baseband system after passing through the analog gain. Accordingly, inaccuracy in the knowledge of the gain of the receiver directly impacts the estimate of actual signal strength at the antenna performed by the baseband system. Filter corner settings affect the transceiver system because precise filter bandwidth is needed. If the filter bandwidth is too wide, then interference signals are not adequately filtered; if the filter bandwidth is too narrow, then the desired received signal is distorted. Quadrature imbalance affects the transceiver system because imbalance in the quadrature distorts the desired signal. DC offset affects the transceiver system because it can cause clipping. The analog baseband circuits can receive the desired signal and the digital baseband will adjust the gain in order to set the received signal to a required level to achieve good demodulation performance. If the DC offset accumulated in the analog baseband circuits is too large, then the signal may be distorted (e.g., "clipped"). Second order intermodulation affects the transceiver systems by increasing the noise floor when interference is present. The interference can be from an external source (e.g., another phone or base station) or generated internally by one or more transmitters in a device. Thus, each of the items listed above can adversely affect a broadcast (e.g., cellular) system.

The disclosed transceiver system utilizes existing hardware in the transceiver to perform self calibration. The term self calibration is used here to distinguish from factory calibration. Factory calibration requires the introduction of external test signals during mass production in order to measure and then compensate for analog imperfections. In contrast, self calibration (as used herein) uses existing hardware (e.g., a transmitter chain inside the transceiver) to introduce test signals after powering up the transceiver (and/or a device that comprises the transceiver) to compensate for analog imperfections. Thus, self calibration has advantages as compared to factory calibration. First, the test signal introduction is done during transceiver power up, reducing or eliminating factory calibration time and reducing costs associated with producing the transceiver and/or the device comprising the transceiver (e.g., a cellular phone). Second, test signals can be generated and measured on one or more (e.g., each) power up of the transceiver or the device comprising the transceiver, allowing analog imperfections to be tracked over time and compensated for accordingly. This can improve performance of the transceiver and the device that uses the transceiver (e.g., the cellular phone).

As discussed above, in some aspects the self calibration system uses the transmitter chain for test signal generation. In other aspects, the transceiver can comprise a specific tone generation circuit or other test vector generation circuit in order to create the necessary signals for calibration. This method is also effective but can be less efficient in that additional circuits have been added in order to generate the test vectors.

Moreover, a path allowing the transmit signal to leak into the receiver is advantageous to perform the self calibration. This leakage typically exists on conventional device designs, and can exist due to one or more of a duplexer, a switch, a coupler, antenna-to-antenna leakage, or a coupling in a printed circuit board (PCB). For many devices, the transmitter chain and a receiver chain are coupled to an antenna by a duplexer. Rejection of the transmitter signal is finite, and thus an adequate amount of leakage is present in order to perform calibration. For other devices operating in modes such as time division duplex (TDD) mode, a switch can be used to couple the receiver chain and the transmitter chain to the antenna. Because the switch is connected to both transmitter chain and the receiver chain, there is adequate leakage for calibration. In some devices, a coupler (e.g., a physical component that intentionally couples the transmitter chain and the receiver chain) can be used to create leakage for self calibration. Leakage from one antenna to another can provide a test signal path that could be used for some level of self calibration. Leakage can be created in a PCB that would couple a transmitter chain to a receiver chain thus allowing signal leakage to be used for self-calibration. Similarly, an integrated circuit can be designed to couple the transmitter chain and the receiver chain to support self calibration. The circuit design can be achieved directly (e.g., by including one or more switches) or indirectly (e.g., through layout such that coupling is created by physical proximity).

As discussed with regard to factory calibration, self calibration can require some combination of analog and/or digital circuits to offset the imperfections in the analog design. A state machine comprising a microprocessor combined with some software can perform calibration algorithms. The calibration control state machine can manage the self calibration process by introducing test vectors, taking measurements, and applying the requisite compensations.

As shown in FIG. 1, a transceiver 100 includes a transmitter chain 102, a receiver chain 104, and a baseband processor 106. The transceiver 100 can further comprise a calibration control state machine 108 connected to one or more of the transmitter chain 102, the receiver chain 104, and the baseband processor 106. The transmitter chain 102 and receiver chain 104 can be in electrical communication with an antenna 110 via a connecting device 112. In some aspects the connecting device 112 can comprise one or more of a switch and a duplexer.

The transmitter chain 102 can comprise a tone generator 114, a local oscillator 116, and an amplifier 117, arranged in series such that the output of the power amplifier is connected to the connecting device 112. In some aspects, one or more of the tone generator 114, the local oscillator 116, and the power amplifier 118 can be in communication with the calibration control state machine 108.

The receiver chain 104 can comprise an amplifier 118 (e.g., a low noise amplifier or other amplifier) connected to a pair of oscillators 120. Each oscillator is connected to a filter 122, which is then connected to a digital front end (DFE) 124 for the receiver chain. In some aspects, the filter 122 can comprise, for example, a Chebyshev filter, a Butterworth filter, and/or the like. The output of the receiver chain 104 is then provided from the DFE 124 to the baseband processor 106. In some aspects, the output of the DFE 124 can be converted using a pair of interface devices 126. In some aspects, the interface devices 126 can comprise digital analog converters (DACs). In other aspects, the interface devices can comprise low-voltage differential signaling (LVDS) transmitters. In some aspects, one or more of the oscillators, the filter, and the DFE can be in communication with the calibration control state machine 108.

The baseband processor 106 can manage one or more functions of the transmitter chain 102 and/or the receiver chain 104. In some aspects, the baseband processor can comprise one or more interface devices 128. In some aspects the interface devices 128 can comprise analog to digital converters (ADCs). In other aspects, the interface devices 128 can comprise one or more LVDS receivers. The baseband processor 106 can further comprise a received signal strength indicator (RSSI) estimator 130. The baseband processor 106 can receive information from the receiver chain 104 and can provide information to one or more of the transmitter chain 102 and the calibration control state machine 108.

The calibration control state machine 108 is in electrical communication with each of the transmitter chain 102, the receiver chain 104, and the baseband processor 106. In some aspects, the calibration control state machine 108 can be used to control one or more properties of one or more of the transmitter chain 102, the receiver chain 104, and the baseband processor 106. The calibration control state machine 108 typically comprises a variety of computer readable media. Exemplary readable media can be any available media that is accessible by the calibration control state machine 108 and comprises, for example and not meant to be limiting, both volatile and non-volatile media, removable and non-removable media. The system memory can comprise computer readable media in the form of volatile memory, such as random access memory (RAM), and/or non-volatile memory, such as read only memory (ROM). The system memory typically can comprise data such as calibration control data and/or program modules such as an operating system and calibration control software that are accessible to and/or are operated on by the calibration control state machine 108.

In some aspects, the DFE 124 and/or the baseband processor 106 can be used to adjust one or more properties of the receiver chain 104 as part of self calibration.

As a particular example, the DFE 124 can be used to correct for receiver chain quadrature imbalance. Major contributors to receiver chain quadrature imbalance include local oscillator (LO) mismatch, filter mismatch, and I/Q channel gain mismatch. To calibrate the imbalance using self calibration, the transmitter chain 102 is used as a test tone generator. After the test tone passes through the receiver chain 104, digital samples of the in-phase and quadrature (I/Q) channels are captured and provided to the baseband processor 106. The baseband processor 106 can perform a time-domain calculation to determine the phase and gain imbalance of the entire receiver chain. The determined phase and gain imbalance can then be communicated to the calibration control state machine 108. The calibration control state machine can use the determined phase and gain imbalance to apply a phase and gain compensation value is applied in the DFE 124.

In some aspects, the captured digital samples of the I/Q channels can be denoted I'(t) and Q'(t); the gain and phase mismatch can be calculated by the baseband processor 106 and/or the calibration control state machine 108 with the equations:

$$\begin{cases} g_{estRX} = \sqrt[2]{\frac{E[I'(t)^2]}{E[Q'(t)^2]}} \\ \theta_{estRX} = \sin^{-1}\left[\frac{E[I'(t) \cdot Q'(t)]}{E[I'(t)^2]} \cdot g_{estRX}\right] \end{cases} \quad \text{equ. 1}$$

where E[ ] is the mathematical expectation function, $g_{estRX}$ is the receiver chain gain imbalance estimation, and $\theta_{estRX}$ is the receiver chain phase imbalance estimation. There are multiple ways that the calibration control state machine 108 can compensate for the frequency dependent phase and gain imbalances.

A first approach comprises determining an average of gain and phase imbalance over plural frequencies and compensating for the average gain and phase imbalance using a constant offset and a delay difference in I/Q path equalizers disposed within the DFE 124. The determined averages of the gain and phase imbalance over offset frequencies, $g_{avgRX}=E[g_{estRX}(f_r)]$, (where $f_r$ is a test tone offset frequency) and $\theta_{avgRX}=\frac{1}{2}[\theta_{estRX}(1 \text{ MHz})+\theta_{estRX}(-1 \text{ MHz})]$ are used as constant imbalances to be applied in the compensation process. Corrected I/Q waveforms, $I_{correced}(t)$ and $Q_{correced}(t)$ can be obtained by applying a correction matrix to I'(t) and Q'(t):

$$\begin{pmatrix} I_{correced}(t) \\ Q_{correced}(t) \end{pmatrix} = \begin{pmatrix} \cos\frac{-\theta_{avgRX}}{2} & \sin\frac{-\theta_{avgRX}}{2} \\ g \cdot \sin\frac{-\theta_{avgRX}}{2} & g \cdot \cos\frac{-\theta_{avgRX}}{2} \end{pmatrix} \begin{pmatrix} I'(t) \\ Q'(t) \end{pmatrix}$$

The frequency dependency of phase imbalance can be approximated with a linear-phase response, a time delay difference is calculated as:

$$\tau = \frac{\frac{1}{2} \cdot [(\theta_{estRX}(f_1) - \theta_{estRX}(f_2)) + (\theta_{estRX}(-f_2) - \theta_{estRX}(-f_1))]}{(f_1 - f_2)}$$

The time delay difference can be introduced into an equalizer disposed in the DFE 124 by the calibration control state machine 108 on I and Q channels, to compensate for the phase mismatch.

A second approach to compensating for quadrature imbalances can use a programmable complex equalizer disposed within the DFE 124. The quadrature imbalances can be modeled as a complex filter, with a frequency response $H(f_t)=g_{estRX}(f_t) \cdot e^{j\theta_{estRX}(f_t)}$, in which $g_{estRX}(f_t)$ and $\theta_{estRX}(f_t)$ are the gain and phase imbalances calculated from equation 1. The calibration control state machine can cause the programmable complex equalizer of the DFE 124 can function as a complex finite impulse response (FIR) equalizer applied to the I/Q channels with the response $$H_{eq}(f_t) = \frac{1}{g_{estRX}(f_t)} \cdot e^{-j\theta_{estRX}(f_t)},$$

to compensate for the imperfections of the analog circuitry.

Figure 2:
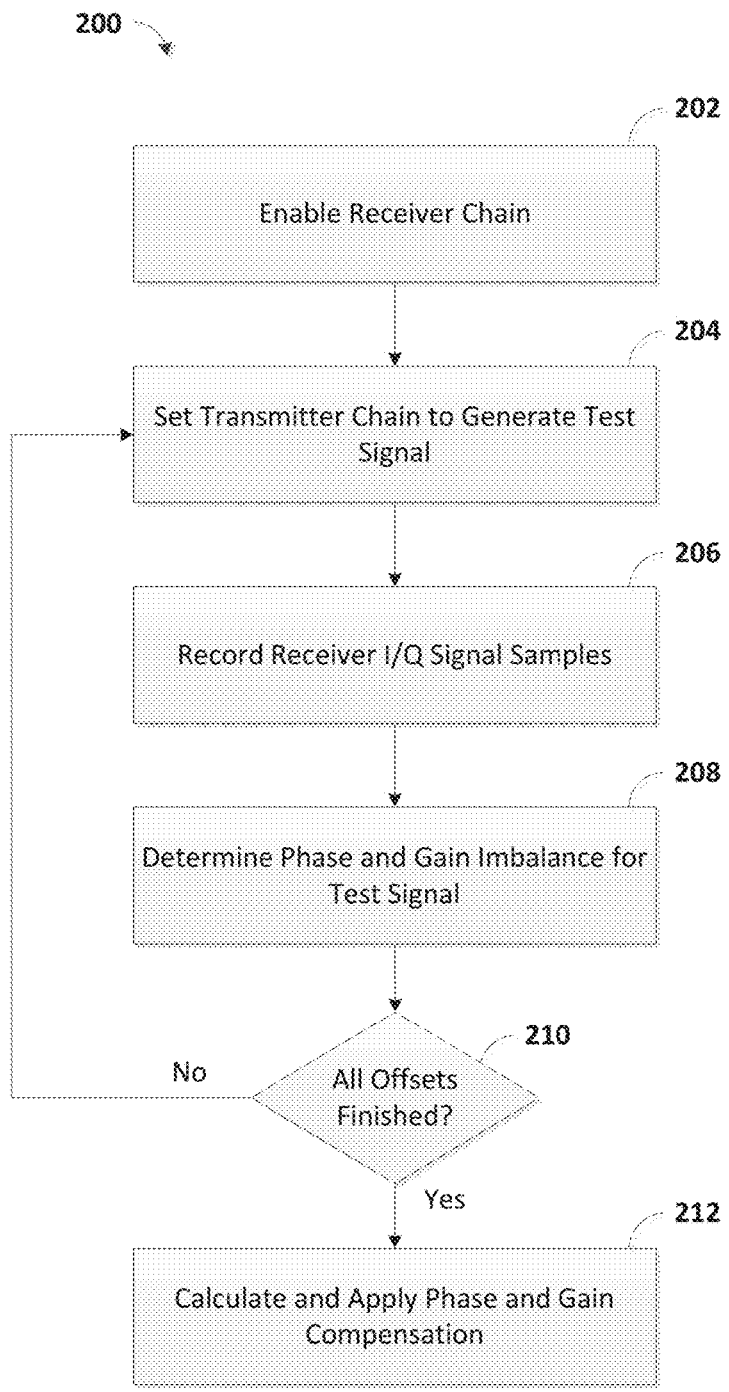
FIG. 2 shows a method of transceiver self calibration.

As a particular, example, FIG. 2 shows a method 200 for quadrature imbalance self calibration of a receiver chain in a transceiver. In block 202, a receiver chain (e.g., the receiver chain 104) can be enabled. As an example, a calibration control state machine (e.g., the calibration control state machine 108) can enable the receiver chain.

In block 204, a transmitter chain can be set to generate a test signal. In some aspects, the test signal can comprise a signal frequency offset with respect to a frequency of the receiver chain.

In block 206, the receiver chain can record samples of a received signal. In some aspects, the samples can comprise I/Q channel samples. In some aspects, the receiver chain can communicate the samples to a baseband processor (e.g., the baseband processor 106).

In block 208, a phase and gain imbalance associated with the test tone can be determined. In some aspects, the phase and gain imbalance can be determined by the baseband processor. In other aspects, the phase and gain imbalance can be determined by a DFE in the receiver chain.

In block 210, it can be determined whether each of a plurality of test signals has been generated. If not all test signals have been generated, the method can return to block 204 using a new test signal. Once all test signals are complete, the method can continue to block 212.

In block 212, phase and gain compensation values can be determined. In some aspects, the phase and gain compensation values can be determined based on the one or more determined phase and gain imbalances associated with the one or more test tones. The phase and gain compensation values can be determined by, for example, the calibration controls state machine. The calibration control state machine can adjust the quadrature balance of the receiver chain. In some aspects, adjusting the quadrature balance can comprise applying the determined phase and gain calculation values to the receiver chain, such as to a DFE (e.g., DFE 124) in the receiver chain.

As another example, the DFE 124 and/or the baseband processor 106 can be used to correct receiver chain gain error. Contributors to receiver chain gain error can include, for example, an amplifier such as the amplifier (LNA) 118. The receiver chain gain setting self calibration can use the transmitter chain 102 to generate the test signal. After attenuation through the leakage path (e.g. the connecting device 112), the test signal goes through the receiver chain 104. A received signal strength indicator (RSSI) value can be determined for each of one or more amplifier gain settings. In some aspects, the RSSI can comprise a square average of the digitized samples of the received signal. An amplifier gain can be determined based on the one or more RSSI values, and the calibration control state machine 108 can compensate for the determined error by applying proper digital gain in the DFE 124.

Figure 3:
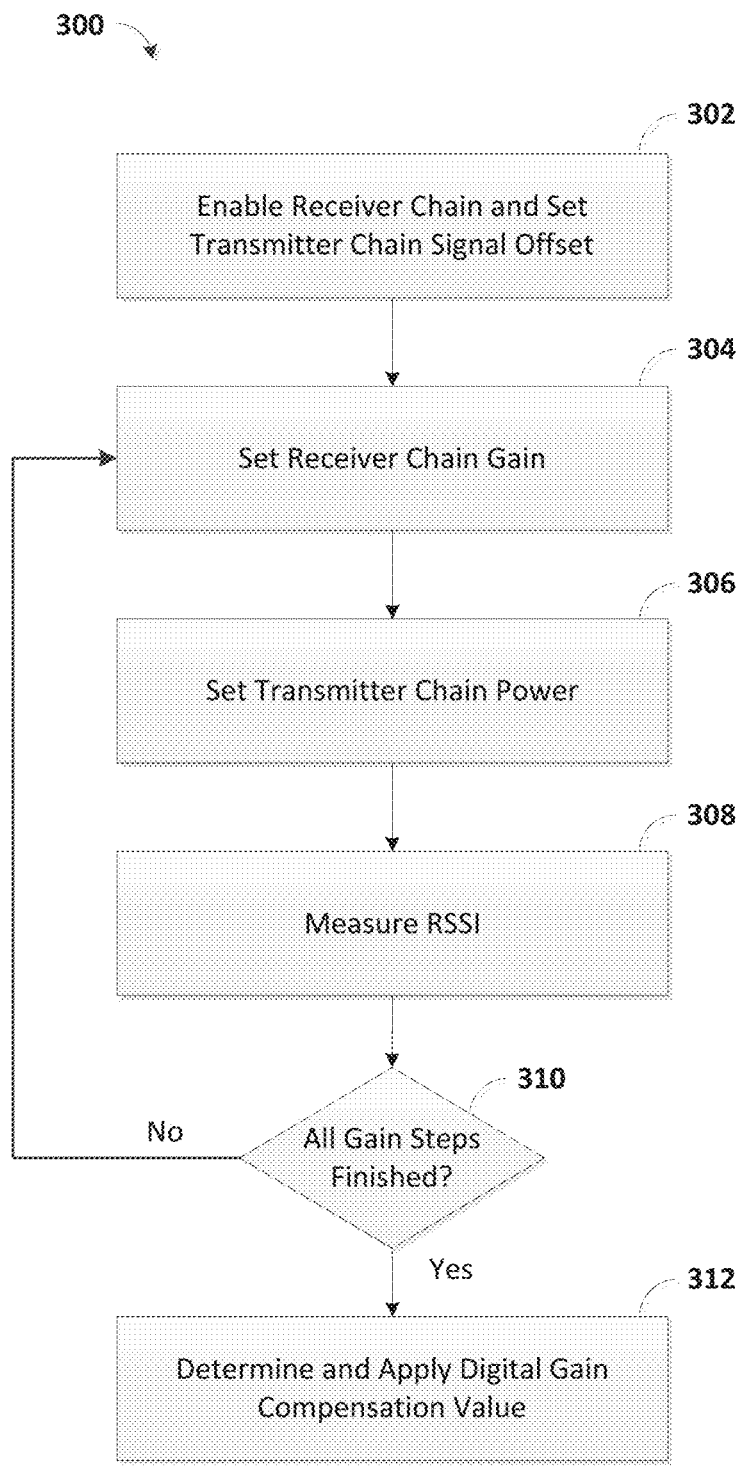
FIG. 3 shows a method of transceiver self calibration.

As a particular example, FIG. 3 shows a method 300 for self calibrating a receiver chain gain in a transceiver. In block 302, a receiver chain (e.g., the receiver chain 104) can be enabled. As an example, a calibration control state machine (e.g., the calibration control state machine 108) can enable the receiver chain. The calibration control state machine can further set a transmitter chain (e.g., the transmitter chain 102) to generate a test signal. In some aspects, the test signal can comprise a signal frequency offset with respect to a frequency of the receiver chain.

In block 304, a gain of the receiver chain can be set to a particular value from among one or more gain blocks. In some aspects, the calibration control state machine can set the gain value. As an example, setting the gain can comprise setting a gain of the amplifier 118.

In block 306, a power of the transmitter chain can be set, for example, by adjusting a power signal provided to one or more of a power amplifier and a local oscillator in the transmitter chain. The transmitter chain can generate a test signal based on the set offset frequency and the set power.

In block 308, the receiver chain can receive the test signal. A received signal strength indicator (RSSI) of the test signal can be measured. In some aspects, the RSSI can be measured by a baseband processor. In other aspects, the RSSI can be measured by a DFE in the receiver chain.

In block 310, it can be determined whether each of the one or more gain blocks has been tested. If fewer than all of the one or more gain blocks have been tested, the method can return to block 304. Once all of the one or more gain blocks have been tested, the method can proceed to block 312.

In block 312, a digital gain compensation value can be determined. In some aspects, the digital gain compensation value can be determined based on one or more (e.g., each) of the one or more measured RSSI values. The determined digital gain compensation value can be applied to the receiver chain by the calibration control state machine.

In receiver chain DC offset self calibration, a DC correction value can be determined in the DFE 124 by averaging signal on I and Q channels. The DC correction value can then be subtracted from the received signal to obtain a desired signal. In some aspects, the DC correction value can be applied after the filter 122 and before the DFE 124. In other aspects, the DC correction value can be applied inside the DFE 124. The DC correction applied before the DFE 124 can be used to prevent clipping within the DFE 124, and the DC correction within the DFE 124 can be used to fine tune a DC offset result.

Figure 4:
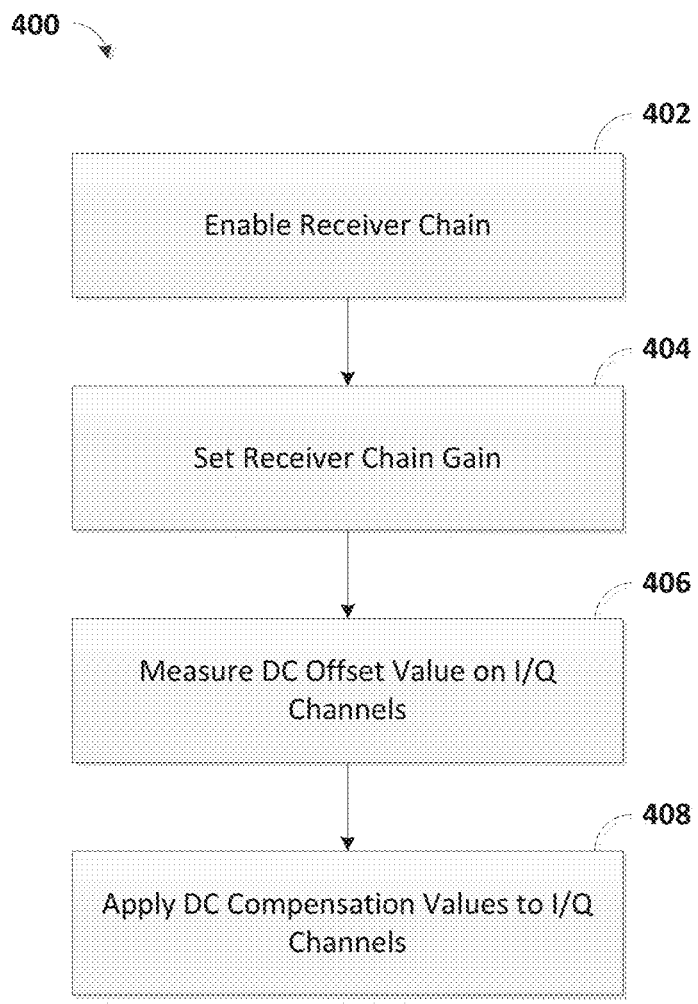
FIG. 4 shows a method of transceiver self calibration.

As an example, FIG. 4 shows a method 400 for receiver chain DC offset self calibration in a transceiver. In block 402, a receiver chain (e.g., the receiver chain 104) can be enabled. As an example, a calibration control state machine (e.g., the calibration control state machine 108) can enable the receiver chain.

In block 404, a gain of the receiver chain can be set. In an aspect, the calibration control state machine can set the gain of the receiver chain.

In block 406, one or more digital samples can be measured at the receiver chain. In some aspects, the digital samples can comprise in-phase and quadrature samples. An average of the measured samples can be determined, and a DC compensation offset coefficient can be determined based on the average of the measured samples.

At block 408, the DC compensation offset coefficient can be applied to the receiver chain. In some aspects, the DC compensation offset coefficient can be separately applied to the I/Q channels of the receiver chain.

As another example, the transceiver can self calibrate filter corners. Due to imperfections in semiconductor manufacture process, there is some uncertain variation in the capacitor and resistor values. As a result, the receiver chain filter corner can be not exactly the desired value, and thus should be calibrated to more closely match the desired value.

In a first filter corner self calibration process, an input to the receiver chain 104 can be switched to a block function test signal generated by the calibration control state machine 108. A block response can be measured by the DFE 124 to calculate an actual filter corner. A compensation value can be calculated by the calibration control state machine 108 and applied onto electrical components (e.g., one or more of capacitors and/or resistors) inside the filter 122.

Figure 5:
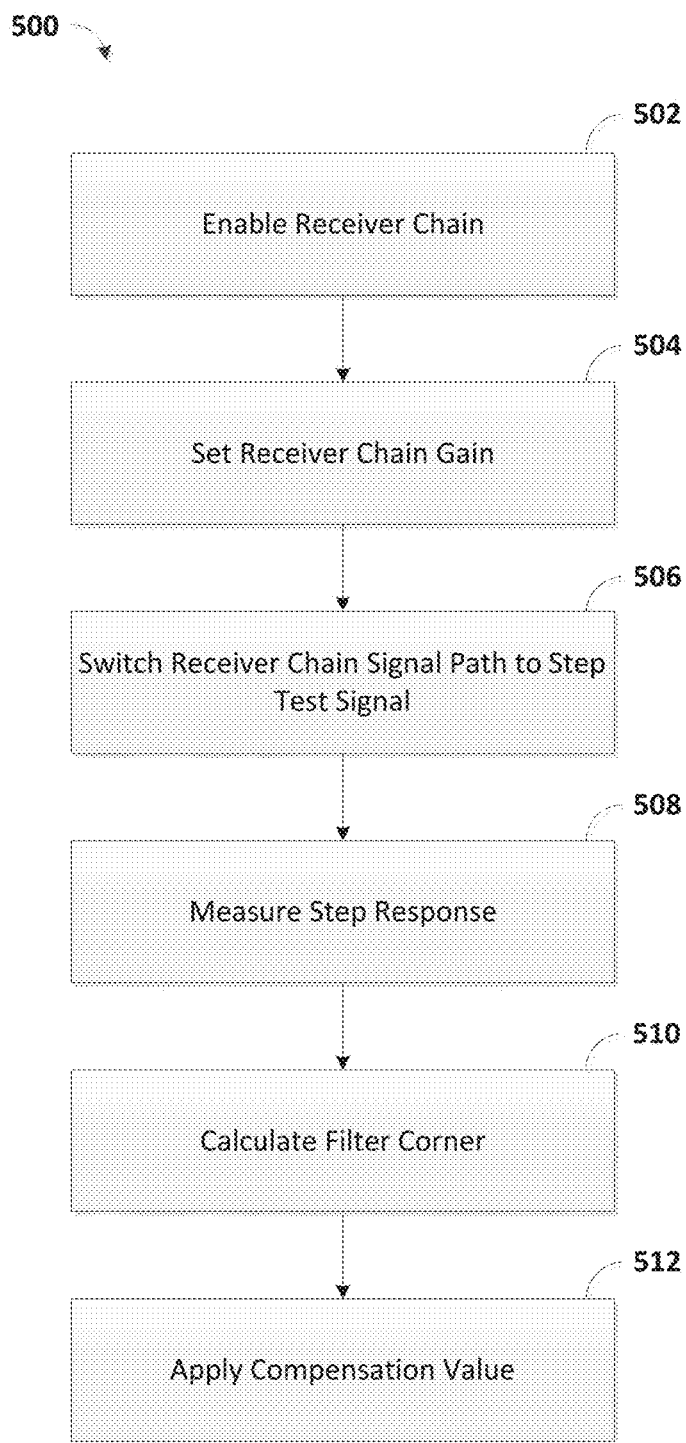
FIG. 5 shows a method of transceiver self calibration.

As a particular example, FIG. 5 shows a method 500 for self calibrating a filter corner of a receiver chain in a transceiver. In block 502, a receiver chain (e.g., the receiver chain 104) can be enabled. As an example, a calibration control state machine (e.g., the calibration control state machine 108) can enable the receiver chain.

In block 504, a gain of the receiver chain can be set. In an aspect, the calibration control state machine can set the gain of the receiver chain.

In block 506, an input if the receiver chain can be switched to a step test signal. In some aspects, the step test signal can be generated by the calibration controls state machine 108. In other aspects, the step test signal can be generated by other hardware present in the transceiver. The input of the receiver chain can be controlled by, for example, the calibration control state machine.

In block 508, step response of a filter (e.g., the filter 122) can be measured. In some aspects, the step response can be measured by a DFE (e.g., the DFE 124). In other aspects, any device positioned downstream of the filter in the receiver chain can be configured for measuring the filter step response. In some aspects, the measured step response can comprise a measured step response for each of the I and Q channels of the receiver chain.

In block 510, filter corners can be determined (e.g., calculated) for each of the I and Q channels of the receiver chain based on the measured step response. The determined filter corners can be transmitted to the calibration control state machine.

In block 512, the calibration control state machine can determine a modified filter corner value to match a desired rejection point. The calibration control state machine can apply the modified filter corner value to the filter in the receiver chain. In some aspects, the modified filter corner value can be applied by adjusting one or more electrical components of the filter. For example, the calibration control state machine can adjust a capacitance of one or more capacitors, a resistance of one or more resistors, and/or the like.

In a second filter corner self calibration process, the transmitter chain 102 can generate multiple test tones. In some aspects, the multiple test tones can be distributed across a bandwidth associated with the receiver chain 104. The test tones can be received at the receiver chain 104, and RSSI measurements associated with digital samples of the received test tones can be determined. Actual rejection point information (e.g., 3 dB corner frequency) of the filter 122 can be found based on the RSSI measurements. Using the actual rejection point information, an error in the filter corner can be calculated, and a compensation value will be applied by the calibration control state machine 108 onto electrical components (e.g., capacitors and/or resistors) inside the filter 122.

Figure 6:
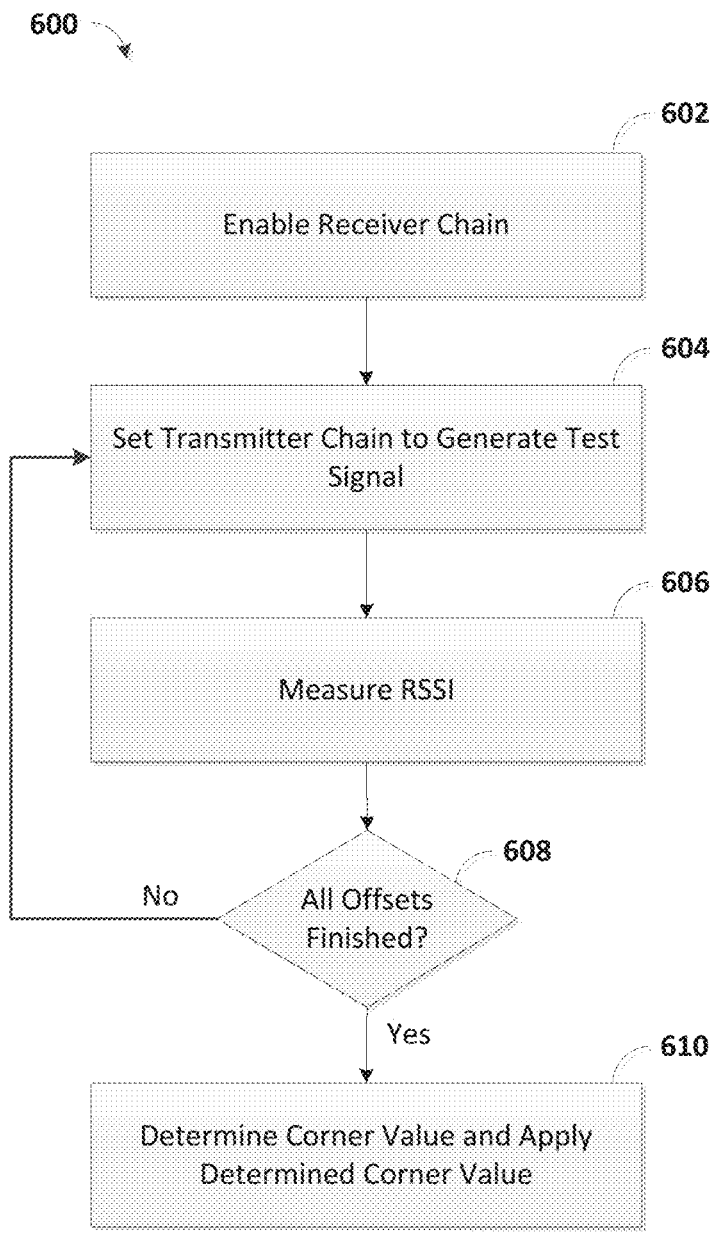
FIG. 6 shows a method of transceiver self calibration.

As a particular example, FIG. 6 shows a method 600 for self calibrating a filter corner of a receiver chain in a transceiver. In block 602, a receiver chain (e.g., the receiver chain 104) can be enabled. As an example, a calibration control state machine (e.g., the calibration control state machine 108) can enable the receiver chain.

In block 604, a transmitter chain (e.g., the transmitter chain 102) can be set to generate a test signal. In some aspects, the test signal can be based on one or more test offsets.

In block 606, the test signal can be received by the receiver chain. An RSSI of the received test signal can be measured at, for example, A DFE downstream from a filter in the receiver chain. In other aspects, any component downstream of the filter can be configured to measure an RSSI of the received test signal. In an aspect, the measured RSSI can be transmitted to the calibration control state machine.

In block 608, it can be determined if all of the one or more test signals have been generated. If not all of the test signals have been generated, the method can return to block 604. Otherwise, the method can continue to block 610.

At block 610, an actual rejection point of the filter can be determined (e.g., calculated) based on the measured RSSI values. In some aspects, the actual rejection point can be determined by the calibration control state machine. The calibration control state machine can determine a modified filter corner value to match a desired rejection point (e.g., a 3 dB corner). The calibration control state machine can apply the modified filter corner value to the filter in the receiver chain. In some aspects, the modified filter corner value can be applied by adjusting one or more electrical components of the filter. For example, the calibration control state machine can adjust a capacitance of one or more capacitors, a resistance of one or more resistors, and/or the like.

In another example, a second order intermodulation self calibration process, can be used to self calibrate the transceiver 100. A transmitter chain 102 can generate a test signal. In some aspects, the test signal can comprise a combination of two single tones. The test signal can be received at the receiver chain 104, and a second order intermodulation product strength can be monitored at the DFE 124 while iterating through a plurality of mixer configurations. Since second order intermodulation is due to a transmit leakage signal, a transmit frequency of the transmitter chain 104 can be tuned as in normal operation. For typical cellular systems, this frequency is somewhere between 45 and 200 MHz offset from the receive frequency. The receiver chain 104 can iterate through a plurality of mixer settings associated with a mixer in the DFE 124 while receiving the test signal. An intermodulation product power associate with the mixer settings can be measured. After the iteration, an optimal mixer configuration (e.g., a configuration with the minimal difference between the measured intermodulation product power and a target intermodulation product power) can be selected. The mixer settings corresponding to a second-order intermodulation product nearest the target intermodulation product power can be applied to a mixer within the DFE 124.

Figure 7:
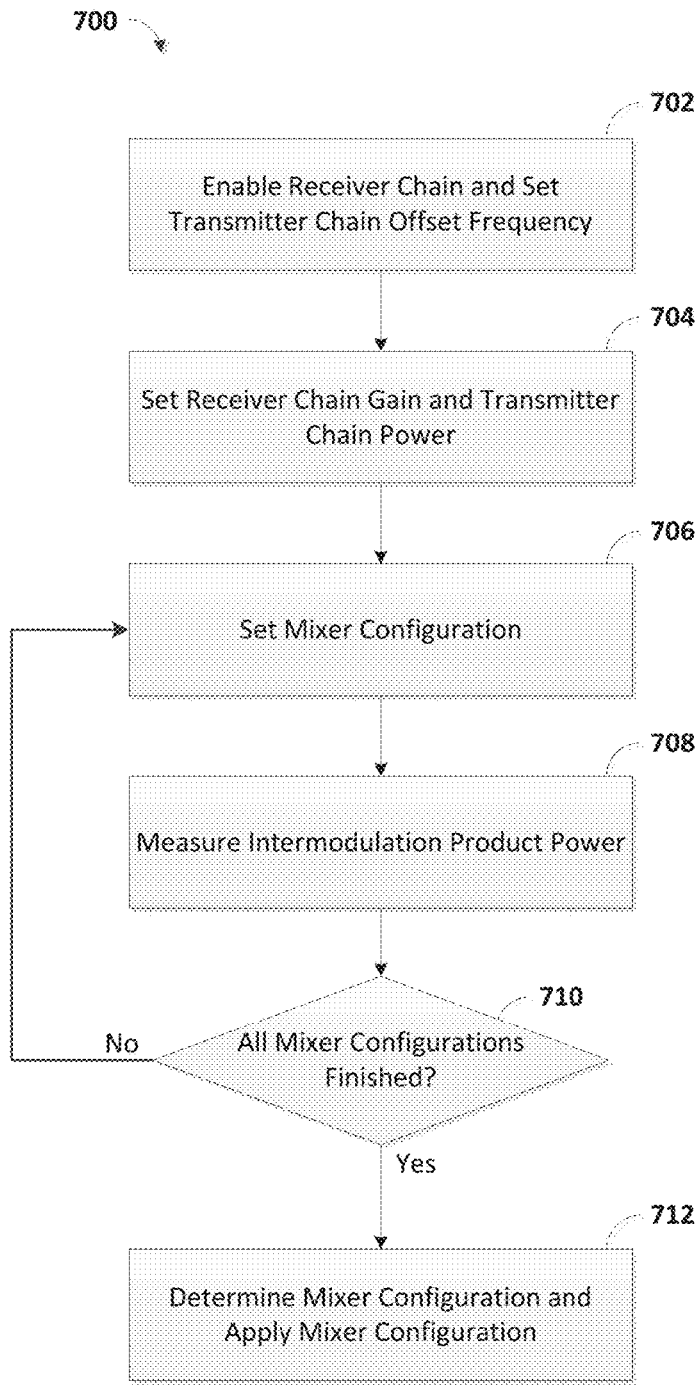
FIG. 7 shows a method of transceiver self calibration.

As a particular example, FIG. 7 shows a method 700 for self calibrating a second order intermodulation product power of a receiver chain in a transceiver. In block 702, a receiver chain (e.g., the receiver chain 104) can be enabled. As an example, a calibration control state machine (e.g., the calibration control state machine 108) can enable the receiver chain. The calibration control state machine can further set a transmitter chain (e.g., the transmitter chain 102) to generate a two-tone signal at a predefined offset frequency. In some aspects, the offset frequency can be based on a predefined receiver frequency.

In block 704, the calibration control state machine can set a gain associated with the receiver chain and a power associated with the transmitter chain. The transmitter chain can transmit a test signal based on the offset and the power. In some aspects, the test signal can comprise two distinct tones. The receiver chain can receive the signal.

In block 706, one of a plurality of predefined mixer configurations can be applied to a mixer disposed within a DFE (e.g., the DFE 124) in the receiver chain. In some aspects, the mixer configurations can be transmitted to the DFE comprising the mixer by the calibration control state machine.

In block 708, a power intermodulation product power associated with the applied mixer configuration can be measured. In some aspects, the intermodulation product power can be measured by the DFE and transmitted to the calibration control state machine.

In block 710, it is determined whether all of the plurality of predefined mixer configurations have been tested. If less than all of the predefined mixer configurations have been tested, the method returns to block 706. Otherwise, the method continues to block 712.

In block 712, it is determined which of the plurality of mixer configurations is associated with the intermodulation product power closest to a target intermodulation product power. In some aspects, the closest can be the closest without exceeding the target, the closest being less than the target, the lowest (e.g., the target intermodulation product power is zero), and/or the like.

While the methods and systems have been described in connection with embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its blocks be performed in a specific order. Accordingly, where a method claim does not actually recite an order to be followed by its blocks or it is not otherwise specifically stated in the claims or descriptions that the blocks are to be limited to a specific order, it is no way intended that an order be inferred, in any respect. This holds for any possible non-express basis for interpretation, including: matters of logic with respect to arrangement of blocks or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A self-calibrating transceiver, comprising:
   a receiver chain comprising a digital front end (DFE);
   a transmitter chain;
   a step function generator; and
   a calibration control state machine in electrical communication with the receiver chain,
   wherein the calibration control state machine is configured to switch a signal path of the receiver chain to include a step function generated by the step function generator and set a gain of the receiver chain to a predetermined value, and
   wherein the DFE is configured to measure a step response and transmit the measured step response to the calibration control state machine, and
   wherein the calibration control state machine is configured to determine a filter corner, based on the measured step response, and adjust one or more of a capacitance and a resistance in each of an amplitude channel and a phase channel of the receiver chain, based on the determined filter corner.

2. A self-calibrating transceiver, comprising:
   a baseband processor;
   a receiver chain comprising a digital front end (DFE);
   a transmitter chain;
   a step function generator; and
   a calibration control state machine in electrical communication with the receiver chain,
   wherein the calibration control state machine is configured to switch a signal path of the receiver chain to include a step function generated by the step function generator, and
   wherein the DFE is configured to measure a response to the generated step function and transmit the measured step response to the calibration control state machine, and
   wherein the calibration control state machine is configured to determine a filter corner, based on the measured step response, and adjust at least one electrical component of the receiver chain, based on the determined filter corner.

3. The self-calibrating transceiver of claim 1, wherein the DFE is configured to measure a step response for each of an in-phase channel of the receiver chain and a quadrature channel of the receiver chain.

4. The self-calibrating transceiver of claim 1, wherein the calibration control state machine is configured to determine the filter corner to match a desired rejection point.

5. The self-calibrating transceiver of claim 1, wherein the calibration control state machine is configured to set the gain of the receiver chain to the predetermined value before switching the signal path of the receiver chain to include the step function.

6. The self-calibrating transceiver of claim 1, wherein the determined filter corner is based on at least one of a filter corner for an in-phase channel of the receiver chain and a filter corner for a quadrature channel of the receiver chain.

7. The self-calibrating transceiver of claim 2, wherein the DFE is configured to measure a step response for each of an in-phase channel of the receiver chain and a quadrature channel of the receiver chain.

8. The self-calibrating transceiver of claim 2, wherein the calibration control state machine is configured to determine the filter corner to match a desired rejection point.

9. The self-calibrating transceiver of claim 2, wherein the determined filter corner is based on at least one of a filter corner for an in-phase channel of the receiver chain and a filter corner for a quadrature channel of the receiver chain.

10. The self-calibrating transceiver of claim 2, wherein the calibration control state machine is configured to set a gain of the receiver chain to a predetermined value before switching the signal path of the receiver chain to include the step function.

11. The self-calibrating transceiver of claim 2, wherein the calibration control state machine is configured to adjust the at least one electrical component by adjusting at least one resistance of a filter in the receiver chain.

12. The self-calibrating transceiver of claim 2, wherein the calibration control state machine is configured to adjust the at least one electrical component by adjusting at least one capacitance of a filter in the receiver chain.

13. A self-calibrating transceiver, comprising:
    a receiver chain comprising a filter;
    a transmitter chain;
    a step function generator; and
    a calibration control state machine configured to:
       switch a signal path of the receiver chain to include a step function generated by the step function generator;
       based on a measured response to the generated step function, determine at least one filter corner; and
       based on the determined at least one filter corner, adjust at least one electrical component of the filter.

14. The self-calibrating transceiver of claim 13, wherein the measured response to the generated step function includes a measured response for each of an I channel of the receiver chain and a Q channel of the receiver chain.

15. The self-calibrating transceiver of claim 13, wherein the calibration control state machine is configured to determine the filter corner to match a desired rejection point.

16. The self-calibrating transceiver of claim 13, wherein the determined at least one filter corner is based on at least one of a filter corner for an in-phase channel of the receiver chain and a filter corner for a quadrature channel of the receiver chain.

17. The self-calibrating transceiver of claim 13, wherein the calibration control state machine is configured to set a gain of the receiver chain to a predetermined value before switching the signal path of the receiver chain to include the step function.

18. The self-calibrating transceiver of claim 13, wherein the receiver chain includes a digital front end configured to measure a response of the receiver chain to the generated step function to produce the measured response.

19. The self-calibrating transceiver of claim 13, wherein the calibration control state machine is configured to adjust the at least one electrical component by adjusting at least one resistance of the filter.

20. The self-calibrating transceiver of claim 13, wherein the calibration control state machine is configured to adjust the at least one electrical component by adjusting at least one capacitance of the filter.

* * * * *